(12) United States Patent
Noda et al.

(10) Patent No.: US 9,473,874 B2
(45) Date of Patent: Oct. 18, 2016

(54) DISTRIBUTION APPARATUS AND DISTRIBUTION METHOD

(71) Applicant: FUJITSU LIMITED, Kawasaki-shi, Kanagawa (JP)

(72) Inventors: Masahide Noda, Kawasaki (JP); Hideto Kihara, Kawasaki (JP); Junichi Yura, Yokohama (JP); Takashi Ohno, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/633,426

(22) Filed: Feb. 27, 2015

(65) Prior Publication Data

US 2015/0281868 A1     Oct. 1, 2015

(30) Foreign Application Priority Data

Mar. 31, 2014  (JP) ................................. 2014-073373

(51) Int. Cl.
| | |
|---|---|
| *H04W 4/00* | (2009.01) |
| *H04W 8/20* | (2009.01) |
| *H04L 29/08* | (2006.01) |
| *H04W 4/02* | (2009.01) |

(52) U.S. Cl.
CPC .............. *H04W 4/001* (2013.01); *H04L 67/12* (2013.01); *H04L 67/34* (2013.01); *H04W 4/021* (2013.01); *H04W 8/205* (2013.01)

(58) Field of Classification Search
CPC ......... G06F 8/61; G06F 9/445; H04L 67/12; H04L 67/34; H04W 4/001; H04W 4/021; H04W 8/205
See application file for complete search history.

(56) References Cited

U.S. PATENT DOCUMENTS

| | | | |
|---|---|---|---|
| 2004/0003051 A1 | 1/2004 | Krzyzanowski et al. | |
| 2004/0044731 A1* | 3/2004 | Chen ................... | H04L 67/2842 709/203 |
| 2009/0061890 A1* | 3/2009 | Andreasson ...... | H04M 1/72525 455/456.1 |
| 2012/0088487 A1* | 4/2012 | Khan .................... | H04W 4/001 455/418 |
| 2012/0173767 A1 | 7/2012 | Kim et al. | |

FOREIGN PATENT DOCUMENTS

| | | |
|---|---|---|
| JP | 2007-241718 | 9/2007 |
| WO | 2009/027109 A1 | 3/2009 |
| WO | 2012/034471 A1 | 3/2012 |

OTHER PUBLICATIONS

Extended European Search Report issued Aug. 20, 2015 in corresponding European Patent Application No. 15156415.0.

* cited by examiner

*Primary Examiner* — Kashif Siddiqui
(74) *Attorney, Agent, or Firm* — Staas & Halsey LLP

(57) ABSTRACT

A distribution apparatus includes: a processor; and a memory which stores a plurality of instructions, which when executed by the processor, cause the processor to execute: storing information of at least one of a device that is available in a predetermined location and an application for controlling the device in a storage unit; distributing the application to a mobile terminal when the mobile terminal is detected in the predetermined location.

19 Claims, 16 Drawing Sheets

FIG. 3

| APPARATUS IDENTIFICATION INFORMATION || APPARATUS RESOURCE INFORMATION |
|---|---|---|
| APPARATUS CLASSIFICATION | MODEL NUMBER | IP ADDRESS |
| PROJECTOR | ABC-300 | 192.168.1.200 |

FIG. 4

| APPARATUS IDENTIFICATION INFORMATION | | APPLICATION INFORMATION | SERVICE INFORMATION | |
|---|---|---|---|---|
| APPARATUS CLASSIFICATION | MODEL NUMBER | | ID | SETTING INFORMATION |
| PROJECTOR | ABC-300 | http://example.jp/ABC-300.app | DisplayService | SOURCE URL http://example.jp/ABC-Service<br>Size: 640×480 |
| PROJECTOR | ABC-400 | http://example.jp/ABC-300.app | DisplayService | SOURCE URL http://example.jp/ABC-Service<br>Size: 800×600 |
| ... | ... | ... | | |

DISTRIBUTION APPARATUS AND DISTRIBUTION METHOD

CROSS-REFERENCE TO RELATED APPLICATION

This application is based upon and claims the benefit of priority of the prior Japanese Patent Application No. 2014-073373, filed on Mar. 31, 2014, the entire contents of which are incorporated herein by reference.

FIELD

The embodiments discussed herein relate to, for example, a distribution apparatus, a distribution method, and a distribution program.

BACKGROUND

Recently, in various types of locations to which a mobile terminal such as a smart phone or a tablet terminal is carried, the mobile terminal is employed to use a peripheral apparatus such as a printer or a projector in the locations.

For example, the following are disclosed in Japanese Laid-open Patent Publication No. 2007-241718. The user carries a mobile terminal to various types of locations, and installs applications or drivers for using peripheral apparatuses in the locations in the mobile terminal. Then, the user sets the apparatus information of the peripheral apparatuses such as Internet Protocol (IP) addresses to the installed applications or the installed drivers. In this manner, the user performs various kinds of settings on the mobile terminal, and links the mobile terminal and the peripheral apparatuses.

SUMMARY

In accordance with an aspect of the embodiments, a distribution apparatus includes: a processor; and a memory which stores a plurality of instructions, which when executed by the processor, cause the processor to execute: storing information of at least one of a device that is available in a predetermined location and an application for controlling the device in a storage unit; distributing the application to a mobile terminal when the mobile terminal is detected in the predetermined location.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 3 is a diagram illustrating an example of information to be stored in an apparatus information DB;

FIG. 4 is a diagram illustrating an example of the information to be stored in the configuration information DB;

DESCRIPTION OF EMBODIMENT

Hereinafter, examples of a distribution device, a distribution method, and a distribution program disclosed in the application are described with reference to the drawings. Further, the disclosure is not limited to the example. The respective examples may be combined in a scope in which there is no contradiction.

Example 1

Entire Configuration

Figure 1:
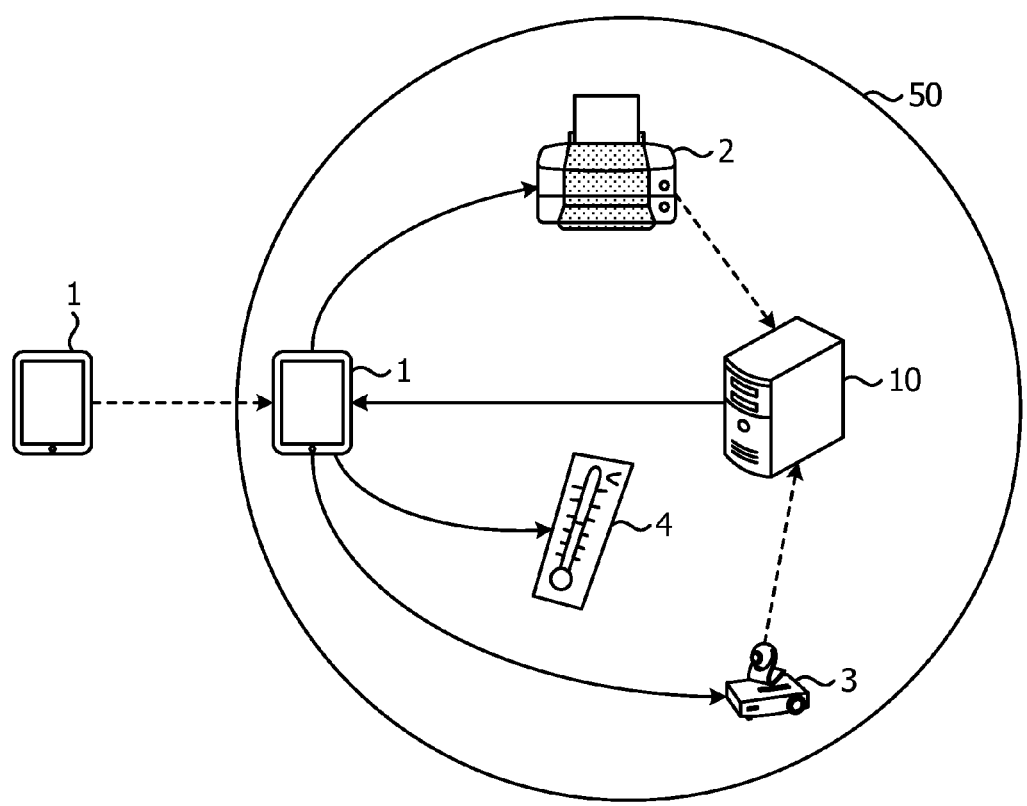
FIG. 1 is a diagram illustrating an example of an entire configuration of a system according to Example 1.

FIG. 1 is a diagram illustrating an example of an entire configuration of the system according to Example 1. As illustrated in FIG. 1, the system includes a mobile terminal 1 and a distribution server 10, and also includes a printer 2, a projector 3, and a thermometer 4 in a predetermined distance from the distribution server 10. Further, the respective apparatuses described herein are provided as examples, and are not intended to limit classifications and the numbers thereof.

The mobile terminal 1 is a terminal that may perform various kinds of wireless communication, and examples include a smart phone, a cellular phone, a notebook computer, and a tablet terminal. The distribution server 10 is a server device that performs various kinds of services and applications.

The printer 2 is a printing machine that prints data, and may receive data through wireless communication or wired communication to perform printing. The projector 3 is a display device that projects an image or a video acquired by wireless communication or wired communication on a predetermined screen. The thermometer 4 has a function of wireless communication, and may transmit a measured peripheral temperature through wireless communication.

In the configuration described above, the distribution server 10 stores information of the peripheral apparatus (in other words, the device) used in the predetermined location. Then, the distribution server 10 generates an application to be used when the peripheral apparatus is used by using the peripheral apparatus information (in other words, device information) stored in the storage unit. Thereafter, when the mobile terminal 1 is detected at the predetermined location at which the peripheral apparatus is available, the distribution server 10 distributes the generated application to the detected mobile terminal 1.

For example, the distribution server 10 stores information relating to the printer 2, the projector 3, and the thermometer 4 positioned in a range 50 in which communication may be performed through the wireless LAN using the same access point, or via short range communication such as Bluetooth.

Then, the distribution server 10 establishes wireless communication with the printer 2, and generates an application A for printing data by using the printer 2. In addition, the distribution server 10 establishes wireless communication with the projector 3, and generates an application B for performing projection by using the projector 3. In addition, the distribution server 10 establishes wireless communication with the thermometer 4, and generates an application C for acquiring the temperature measurement value.

Thereafter, if the mobile terminal 1 moves from the outside of a range 50 into the range 50, the distribution server 10 detects the entrance of the mobile terminal 1 into the range 50, and distributes the application A, the application B, and the application C to the mobile terminal 1. The mobile terminal 1 may use the printer 2, the projector 3, and the thermometer 4 by executing respective applications.

Accordingly, when the user enters a certain place with the mobile terminal 1, the distribution server 10 which detects the entrance generates applications for allowing the mobile terminal 1 to use peripheral apparatuses in the place such as a projector, and distributes the applications to the mobile terminal 1. As a result, the mobile terminal 1 may easily use the peripheral apparatuses in the place.

(Functional Configuration)

Figure 2:
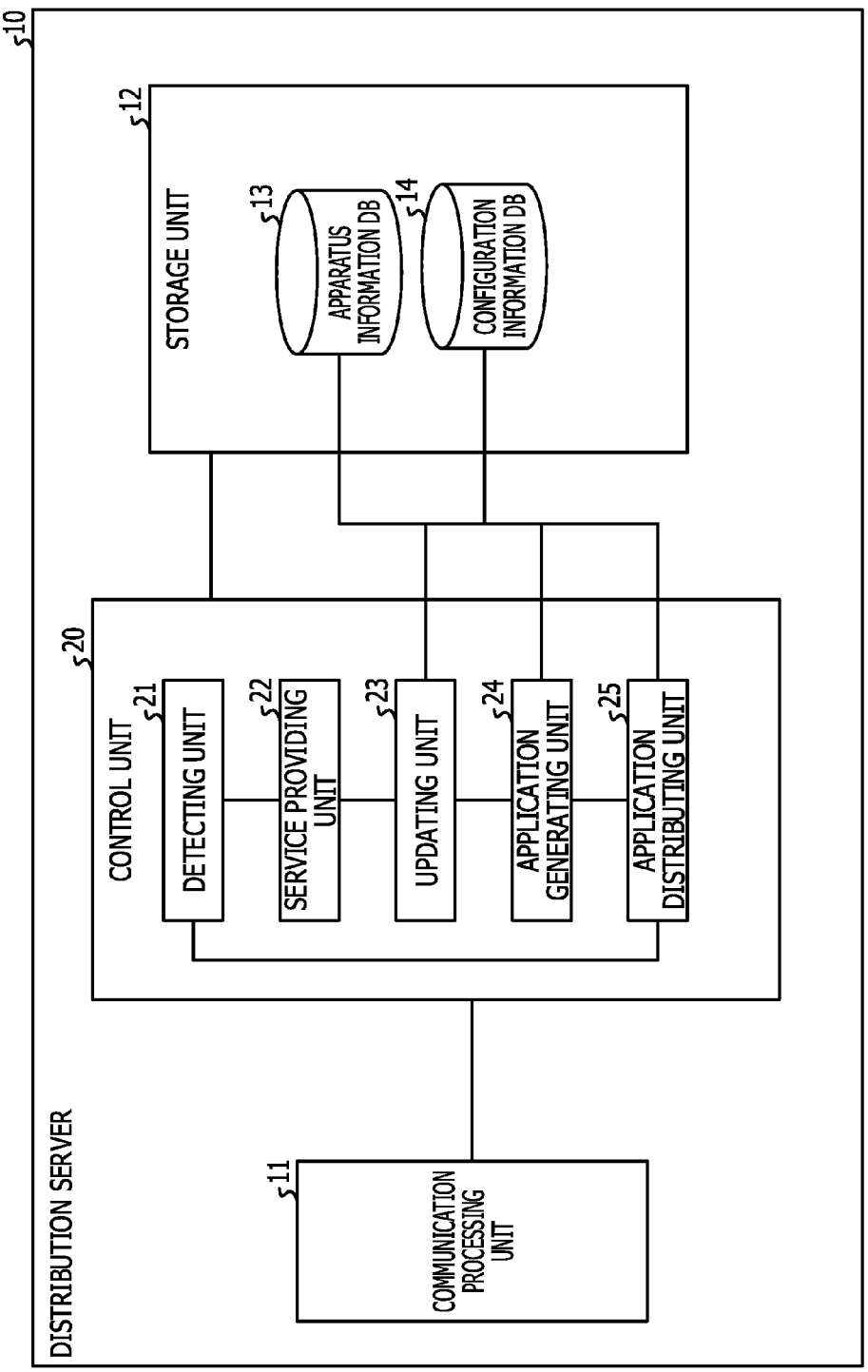
FIG. 2 is a block diagram illustrating a functional configuration of a distribution server according to Example 1.

FIG. 2 is a block diagram illustrating a functional configuration of a distribution server according to Example 1. As illustrated in FIG. 2, the distribution server 10 includes a communication processing unit 11, a storage unit 12, and a control unit 20.

The communication processing unit 11 is a processing unit that controls communication with other devices. For example, the communication processing unit 11 receives various kinds of information from the mobile terminal 1 through wireless communication, and transmits the applications to the mobile terminal 1 through wireless communication.

The storage unit 12 includes an apparatus information database (DB) 13 and a configuration information DB 14, and is a storage device such as a hard disk or a semiconductor memory.

The apparatus information DB 13 is a storage unit that stores information relating to the peripheral apparatus. Specifically, the apparatus information DB 13 stores the information for identifying the peripheral apparatus existing in the range 50 in which wireless communication may be performed. FIG. 3 is a diagram illustrating an example of information to be stored in the apparatus information DB 13. Here, the stored information is the information of the peripheral apparatus which is actually used, and is stored by the operator or is automatically updated by the updating unit 23 described later.

As illustrated in FIG. 3, the apparatus information DB 13 stores apparatus identification information and apparatus resource information in an associated manner. The apparatus identification information is the information for identifying which apparatuses are the peripheral apparatuses, and includes the apparatus classifications and the model numbers. The apparatus classification refers to classification of the peripheral apparatus, and the model number refers to a model number of the peripheral apparatus. The apparatus resource information is the information desired for the application or the service to use the corresponding apparatus, for example, an IP address. Further, the resource information is not limited to the IP address, and may use a Bluetooth ID.

In the example of FIG. 3, as the peripheral apparatus that is available, the apparatus information DB 13 stores a projector having a model number of "ABC-300", and "192.168.1.200" is set to the projector as the IP address.

The configuration information DB 14 stores the information relating to the information or the service relating to the application for using the peripheral apparatus. Specifically, the configuration information DB 14 stores a correspondence table of applications and services for using the apparatus identification information and the service. Here, in addition to the peripheral apparatus that may be actually used, the stored information includes the information of the peripheral apparatus that may actually be used in the future, and is stored by an operator or the like. The configuration information DB 14 may be outside the distribution server 10, or may be included in the storage unit of the distribution server 10.

FIG. 4 is a diagram illustrating an example of the information to be stored in the configuration information DB 14. As illustrated in FIG. 4, the configuration information DB 14 stores the apparatus identification information, the application information, and the service information in an associated manner. Here, the stored apparatus identification information is the same as the information stored in the apparatus information DB 13, and is configured with the apparatus classification and the model number.

The application information is the information indicating the location of the template of the application to be used when the peripheral apparatus is used. The service information is the information relating to the services that use the peripheral apparatus, and is configured with an ID, the setting information. The ID is the information for identifying the service, and the setting information is the information indicating the acquisition source of the service process itself, the content of the service, and the like. Further, a parameter of the service or the like is included in the setting information. In addition, conditions for using the service and the application may be included in the service information.

In the example of FIG. 4, the template of the application using a projector of which the model number is "ABC-300" may be got from "http://example.jp/ABC-300.app". In addition, the service using the projector is identified by an ID "DisplayService", and the process for providing the service may be got from "http://example.jp/ABC-Service". In addition, the display size of the projector is "640×480" pixels.

The control unit 20 is a processing unit that manages the entire distribution server 10, and is, for example, a processor. The control unit 20 includes a detecting unit 21, a service providing unit 22, an updating unit 23, an application generating unit 24, and an application distributing unit 25. The detecting unit 21, the service providing unit 22, the updating unit 23, the application generating unit 24, and the application distributing unit 25 are examples of electronic circuits, or examples of processes that are performed by the processor.

The detecting unit 21 is a processing unit that detects the mobile terminal 1. Specifically, the detecting unit 21 detects the mobile terminal 1 that enters the range 50 from the outside of the range 50. For example, if the detecting unit 21 periodically transmits wireless signals and detects responses thereof, the detecting unit 21 detects whether the mobile terminal 1 exists in the range 50. In addition, when the detecting unit 21 receives wireless signals transmitted from the mobile terminal 1 in the range 50 or various kinds of requests, the detecting unit 21 detects that the mobile terminal 1 exists. Then, if the detecting unit 21 detects the mobile terminal 1, the detecting unit 21 notifies the detection to the application distributing unit 25. At this point, a terminal name, an IP address, an identifier, or the like for identifying the mobile terminal 1 are also notified.

The service providing unit 22 is a processing unit that performs various kinds of services. Specifically, the service providing unit 22 performs the service provided by the distribution server 10 using the peripheral apparatus. In addition, the service providing unit 22 performs a service for using the service performed by the peripheral apparatus, or performs a service for linking a service to another server through a distribution server or the like. For example, the service providing unit 22 acquires a process from an acquisition source of the setting information stored in the configuration information DB 14.

The updating unit 23 is a processing unit that updates the information stored in the apparatus information DB 13. Specifically, the updating unit 23 acquires the information of peripheral apparatus actually operated in the range 50, and updates the apparatus information DB 13. For example, the updating unit 23 identifies the peripheral apparatus in the operation or acquires the information of the peripheral apparatus by using Universal Plug and Play (UPnP) or the like. Then, the updating unit 23 updates the apparatus information DB 13 by using the acquired information. In addition, the updating unit 23 updates the service in the operation by using the updated information.

In addition, when the information of the peripheral apparatus is updated, the updating unit 23 also updates the already generated application by using the information of the peripheral apparatus after the update. For example, when the IP address of the peripheral apparatus is changed, the updating unit 23 updates the IP address of the peripheral apparatus set in the already generated application, distributes the application after the updating to the mobile terminal 1, and updates the application.

The application generating unit 24 is a processing unit that uses the peripheral apparatus information stored in the apparatus information DB 13 or the configuration information DB 14, and generates the application used when using the peripheral apparatus. Specifically, the application generating unit 24 sets the service information relating to the service that uses the apparatus information and the peripheral apparatus for identifying the peripheral apparatus, to be the template of the application that uses the peripheral apparatus, and generates the application. In addition, the application generating unit 24 sets the apparatus information for identifying the peripheral apparatus and the service information relating to the service using the peripheral apparatus to be the service, and also to be the template of the application using the service, and generates the application.

For example, when the application generating unit 24 generates the application using the projector "ABC-300", the application generating unit 24 acquires the template of the application from "http://example.jp/ABC-300.app" stored in the configuration information DB 14. Then, the application generating unit 24 sets the ID "DisplayService" of the service information stored in the configuration information DB 14 and the IP address "192.168.1.200" stored in the apparatus information DB 13, to the template, and generates the application.

Specifically, a special value is used in order to read a thermometer (DEF-40G) which is a peripheral apparatus. An access logic for the DEF-40G is inserted in an application that may be obtained from "http://example.jp/DEF-40G.temp.app", and an input of the special value is also included therein. Meanwhile, an access logic for HIJ-AAA is inserted in an application that may be obtained from "http://example.jp/HIJ-AAA.temp.app", and the special value used in the DEF-40G is not included therein. A URL of a thermometer is not included in any template, and the application is completed by embedding a value acquired from a service parameter stored in each of the respective units.

In addition, when the application generating unit 24 generates the application that uses the service using the projector "ABC-300", the application generating unit 24 gets the service process from "http://example.jp/ABC-Service" stored in the configuration information DB 14. At this point, the application generating unit 24 acquires the ID "DisplayService" of the service information or the IP address "192.168.1.200", for the corresponding service. Then, the application generating unit 24 sets the ID "DisplayService" of the service information, the IP address of the distribution server 10, or the like to the template of the application got from "http://example.jp/ABC-300.app" stored in the configuration information DB 14.

If the acquisition source URL of the service process is described as an example of the setting information of the service, the application generating unit 24 substitutes the service of the service ID into the service corresponding to the model number. As described above, the service process is substituted according to the connected apparatus so that the difference of the access process to the apparatus is absorbed.

In addition, when an operation parameter of the service process is described as the service setting information, the application generating unit 24 updates the operation of the service of the service ID using the parameter corresponding to the model number. According to this, a difference of screen sizes of the projector is reflected to the service, and coordinates corresponding to an instruction indicating "a center of a screen" may be calculated. In addition, it is possible to cause the service to recognize the plurality of projectors, and then to deal with the screens of the plurality of projectors as one big screen.

In addition, when a plurality of apparatuses of the same kind are registered in the apparatus information DB 13 or the like, the application generating unit 24 may be set to include the number of apparatuses in the information set in the service configuration function. Accordingly, when there are a plurality of thermometers, the application generating unit 24 may provide a service that returns an average of the results obtained by accessing the respective thermometers.

As described above, a method for using an apparatus is written in the template in the state in which embedding is desired. Then, the application generating unit 24 acquires the service parameters stored in the apparatus information DB 13 or the configuration information DB 14, and embeds the service parameters to the template of the application so that the application that is available in the range 50 is generated. Further, the service parameter is, for example, the URL for accessing the apparatus or the service. In addition, the application generating unit 24 stores the generated application in the storage unit 12.

The application distributing unit 25 is a processing unit that distributes the application generated by the application generating unit 24. For example, the application distributing unit 25 distributes the application generated by the application generating unit 24 to the mobile terminal 1 detected by the detecting unit 21. Here, the distributed applications are set to be automatically installed, and automatically uninstalled after a predetermined time since the mobile terminal 1 is out of the range 50.

(Application Distribution Process)

Figure 5:
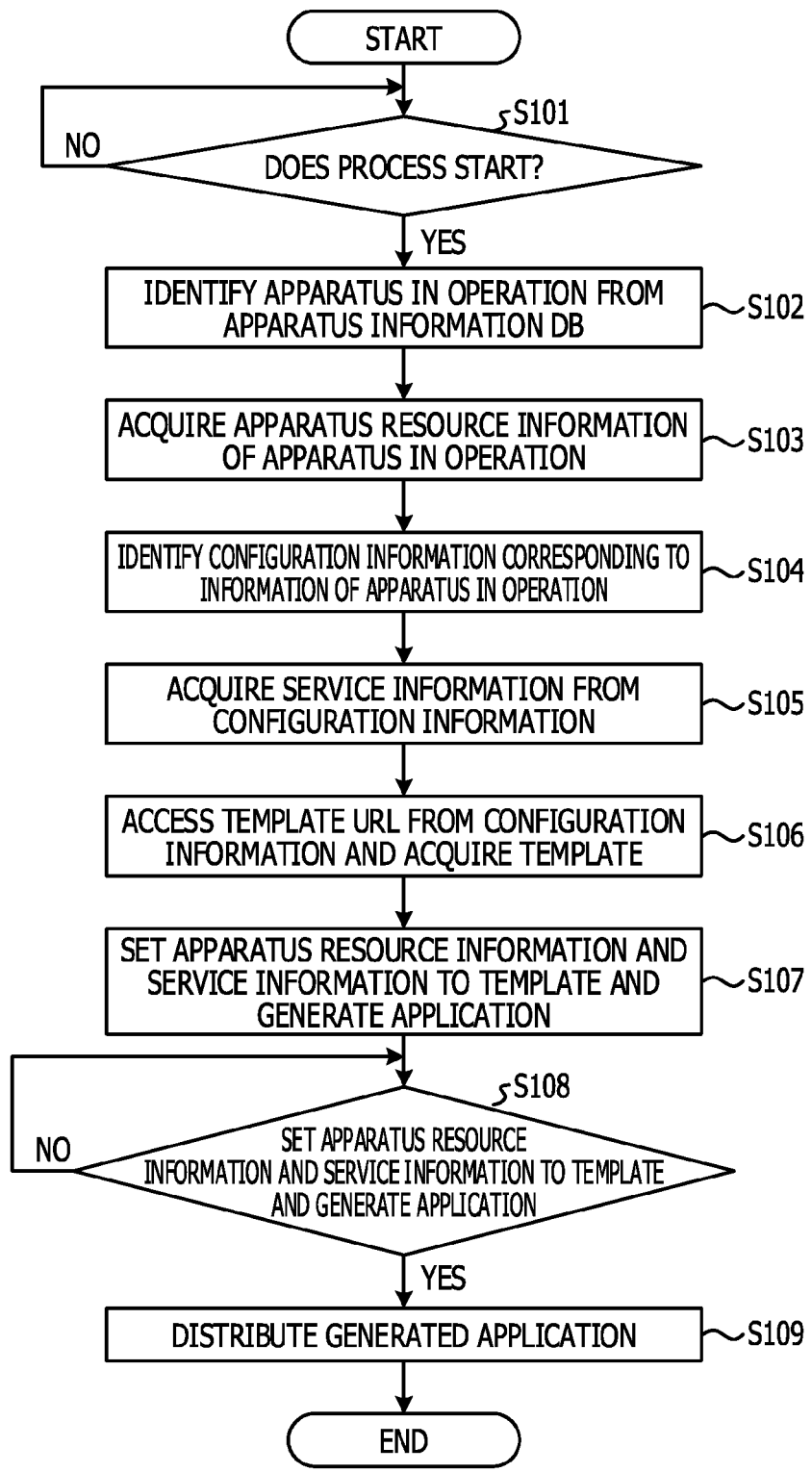
FIG. 5 is a flow chart illustrating a flow of an application distribution process according to Example 1.

FIG. 5 is a flow chart illustrating a flow of an application distribution process according to Example 1. As illustrated in FIG. 5, if the application generating unit 24 is instructed to start a process by an operator or the like (S101: Yes), the application generating unit 24 identifies an apparatus in operation from the apparatus information DB 13 (S102), and then acquires the apparatus resource information of the apparatus in operation from the configuration information DB 14 (S103).

Subsequently, the application generating unit 24 identifies the configuration information corresponding to the information of the apparatus in operation from the configuration information DB 14 (S104), and acquires the service information from the identified configuration information (S105). Then, the application generating unit 24 accesses the URL for the template of the application information corresponding to the identified configuration information, and then acquires the template of the application (S106).

Thereafter, the application generating unit 24 sets the apparatus resource information and the service information to the acquired template of the application, and then generates the application (S107).

Then, if the detecting unit 21 detects the mobile terminal 1 entering the range 50 (S108: Yes), the application distributing unit 25 distributes the application generated by the application generating unit 24 to the mobile terminal 1 (S109).

(Update Process)

Figure 6:
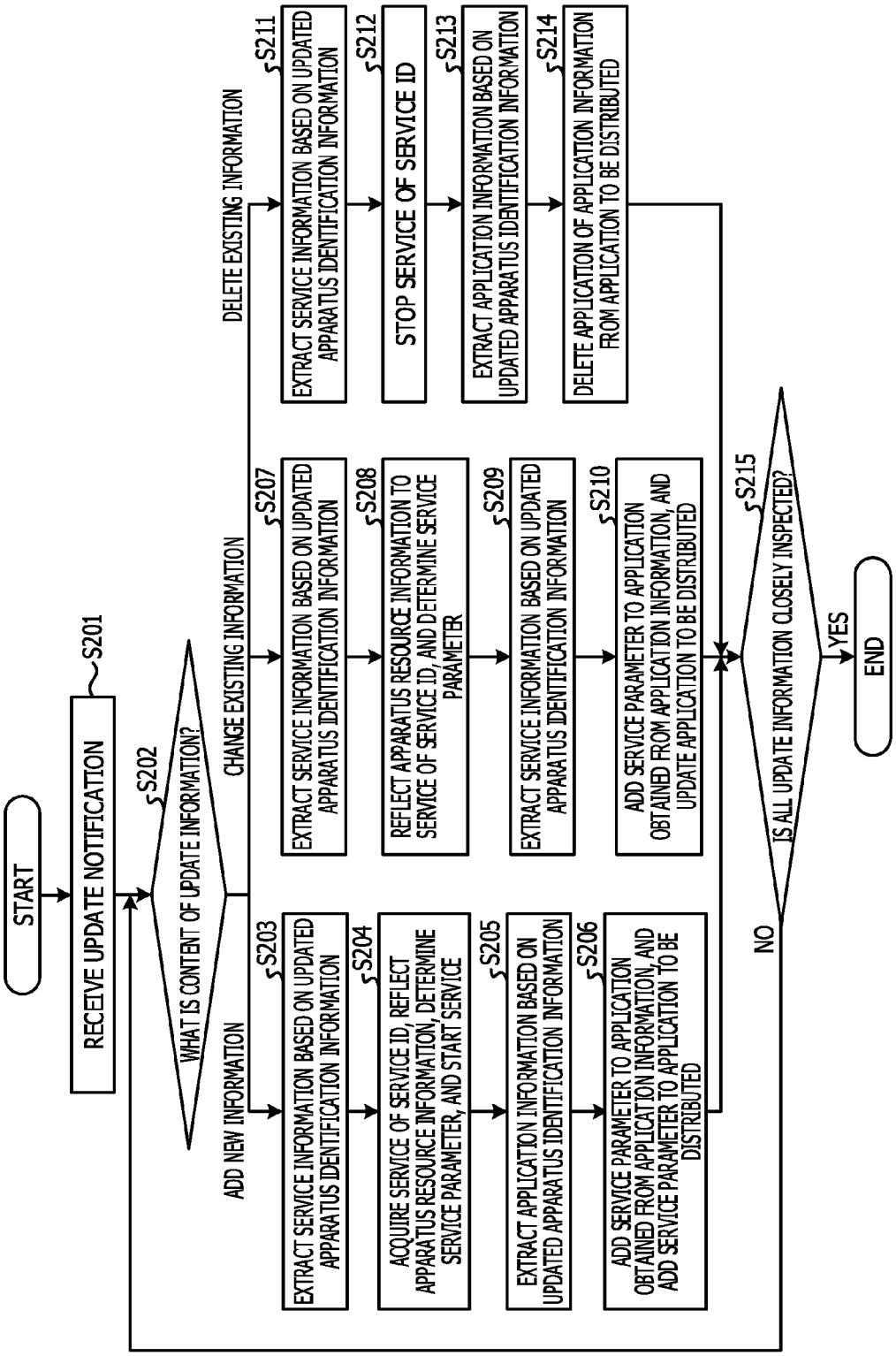
FIG. 6 is a flow chart illustrating a flow of an update process according to Example 1.

FIG. 6 is a flow chart illustrating a flow of an update process according to Example 1. As illustrated in FIG. 6, the updating unit 23 receives the update notification by detection using UPnP or instruction by the operator (S201), and determines the content of the update information (S202).

When the content of the update information is to add new information, the updating unit 23 extracts the service information based on the updated apparatus identification information (S203). Then, the updating unit 23 acquires the service of the service ID from the acquired service information, reflects the apparatus resource information to the acquired service, and then determines the service parameter to start the service (S204).

Thereafter, the updating unit 23 extracts the application information based on the updated apparatus identification information (S205), adds the service parameter to the application obtained from the application information, and then adds the service parameter to the application to be transmitted (S206).

Meanwhile, when the content of the update information is to change existing information, the updating unit 23 extracts the service information based on the updated apparatus identification information (S207). Then, the updating unit 23 reflects the apparatus resource information to the service of the service ID according to the acquired service information, and then determines the service parameter (S208).

Thereafter, the updating unit 23 extracts the application information based on the updated apparatus identification information (S209), adds the service parameter to the application obtained from the application information, and then updates the application to be distributed (S210).

Meanwhile, when the content of the update information is to delete existing information, the updating unit 23 extracts the service information based on the updated apparatus identification information (S211). Then, the updating unit 23 identifies the service ID from the acquired service information, and stops the corresponding service (S212). Thereafter, the updating unit 23 extracts the application information based on the updated apparatus identification information (S213), and deletes the application corresponding to the application information from the application to be distributed (S214).

Then, if all the update information is closely inspected (S215: Yes), the updating unit 23 ends the process, and if there is update information which is not closely inspected (S215: No), the updating unit 23 repeats the processes subsequent to S202.

(Effect)

In this manner, the distribution server 10 collects the apparatus information in the place such as an arrangement of the input and output apparatus in the place or how to use the input and output apparatus in the place. The distribution server 10 configures a service on the server side appropriate for using the apparatus in the place, based on the collected information. The distribution server 10 configures an application for the terminal so as to use the configured service. Then, the distribution server 10 distributes the application configured in the terminal entering the place by a push service so that the application may use the apparatus in the place directly or indirectly through a server.

Accordingly, the distribution server 10 may realize a dedicated terminal adapted to the apparatus in the place. As a result, the user may easily use the peripheral apparatus without performing an operation of searching for the peripheral apparatus, an operation of selecting and installing the application corresponding to the peripheral apparatus, and an operation of setting the apparatus information to the application.

In addition, since the distribution server 10 acquires the update of the apparatus information in the place, and reconstructs the application or the service, the condition of the apparatus in the place may be quickly reflected. When an apparatus is added as an update of the information of the apparatus in the place, the distribution server 10 may operate a service by distributing a new application. Therefore, it is possible to quickly reflect the condition of the apparatus in the place.

In addition, when an apparatus is removed as an update of the information of the apparatus in the place, the distribution server 10 may stop the service by stopping distribution of the application. Therefore, the condition of the apparatus in the place may be quickly reflected. When there were n users, all the users had to perform the same operations for their respective terminals until now. However, the n users now may use the same applications and the same settings through the setting of the apparatus in the place by one operator.

Example 2

Next, an example in which the distribution server 10 provides a service for using the projector 3, and distributes an application for using the service to the mobile terminal 1 is described. Further, in the drawings of Example 2 and the subsequent drawings, when content is omitted, an indication "(omitted)" may be provided. However, the specific content is set to be the same as that described in other examples.

(Application Distribution Example)

Figure 7:
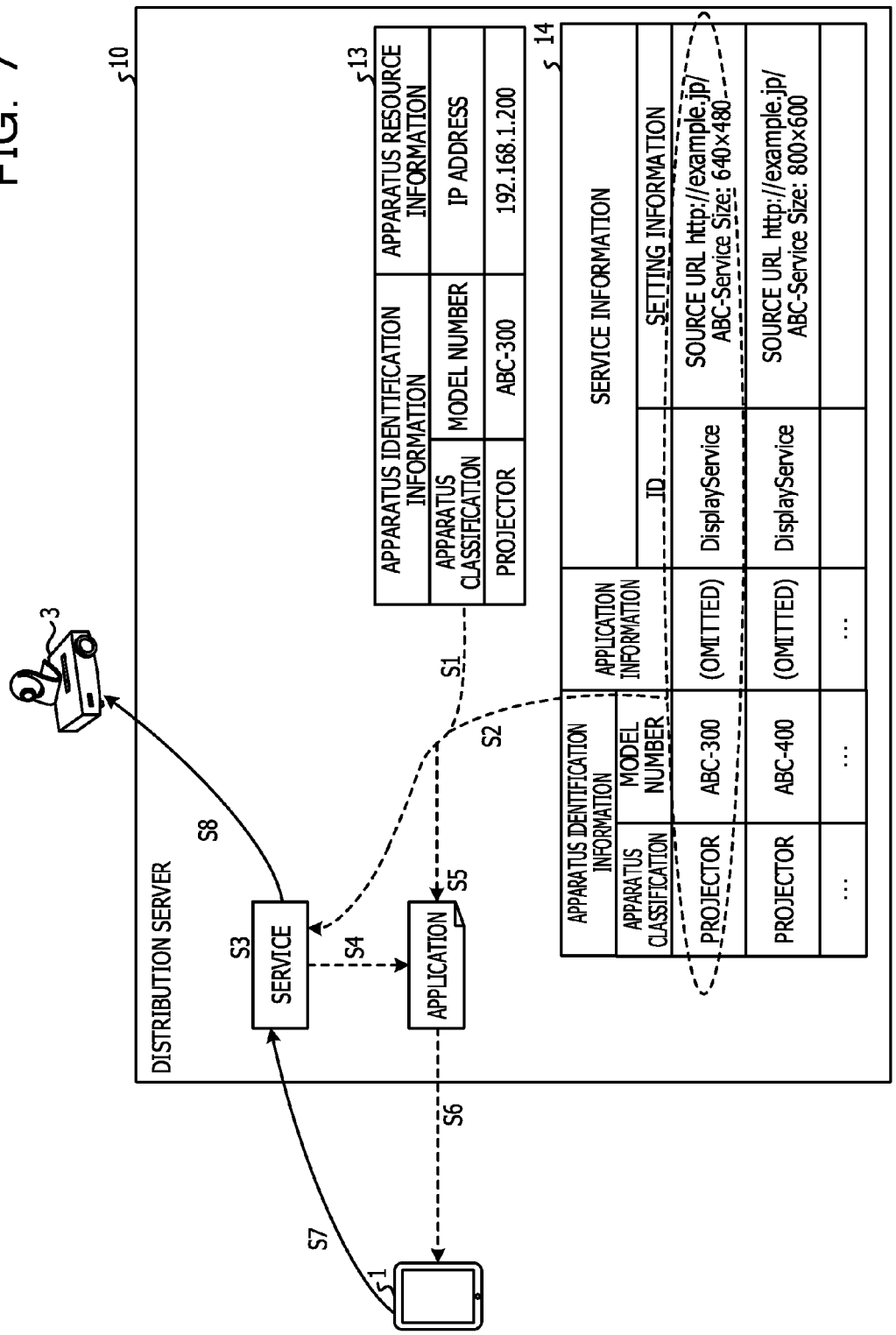
FIG. 7 is a diagram illustrating distribution of an application for using a projector service according to Example 2.

FIG. 7 is a diagram illustrating distribution of an application for using a projector service according to Example 2. As illustrated in FIG. 7, the service providing unit 22 of the distribution server 10 refers to the apparatus information DB 13, confirms that the projector "ABC-300" is in operation, and acquires the IP address "192.168.1.200" of the projector "ABC-300" (S1).

Subsequently, the service providing unit 22 identifies the configuration information corresponding to the projector "ABC-300" from the configuration information DB 14, and acquires the ID "DisplayService" of the service (S2). Thereafter, the service providing unit 22 acquires a process by accessing the URL stored in the setting information of the projector "ABC-300", and starts the service (S3). At this point, the service providing unit 22 sets a service ID, a model number, and an IP address to the corresponding service.

Then, the application generating unit 24 identifies the application information corresponding to the projector "ABC-300" from the configuration information DB 14, accesses the URL identified in the application information, and acquires the template of the application so that various kinds of information are set (S4 and S5). Specifically, the application generating unit 24 sets the service ID and the model number which are acquired from the configuration information DB 14, the IP address which is identified from the apparatus information DB 13, or the like, to the template of the application.

Thereafter, if the detecting unit 21 is in the range 50, the application distributing unit 25 distributes the application generated by the application generating unit 24 to the mobile terminal 1 (S6).

As a result, the application that may perform communication with the projector 3 may be automatically installed in the mobile terminal 1. Therefore, the mobile terminal 1 may transmit video data or the like to the projector 3 (S8) through the service of the distribution server 10 (S7) by executing the installed application.

(Application Update Example)

Figure 8:
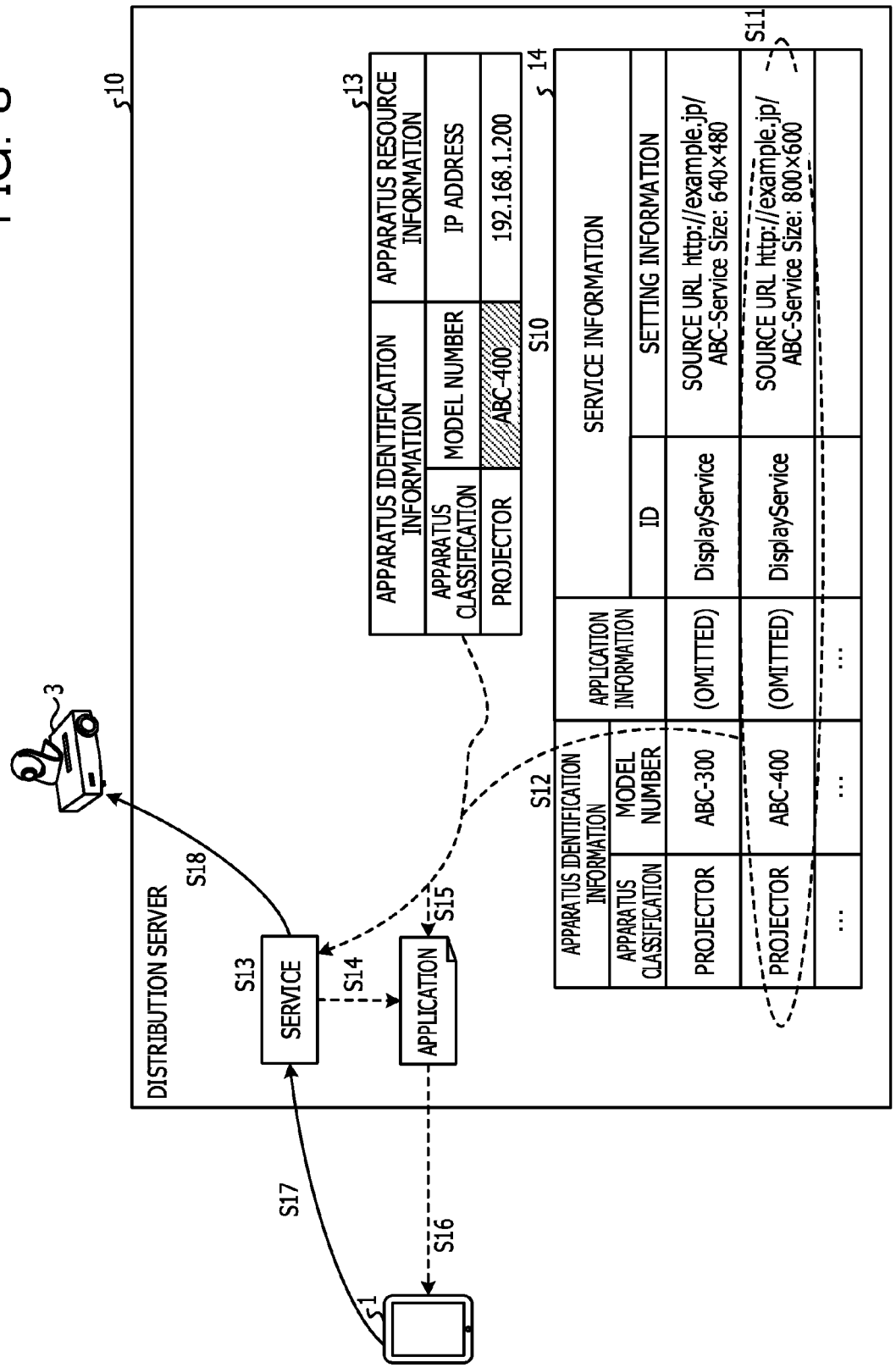
FIG. 8 is a diagram illustrating distribution of the application when the projector service according to Example 2 is changed.

FIG. 8 is a diagram illustrating distribution of the application when the projector service according to Example 2 is changed. Specifically, an example in which a model number of the projector is updated from the state of FIG. 7 is illustrated.

As illustrated in FIG. 8, the updating unit 23 of the distribution server 10 refers to the apparatus information DB 13, and confirms that the projector "ABC-300" is updated to a projector "ABC-400" (S10). Here, the updating unit 23 confirms that the IP address is not changed.

Moreover, the updating unit 23 identifies the configuration information corresponding to the projector "ABC-400" from the configuration information DB 14 (S11). Here, the updating unit 23 determines that reacquisition is not desired based on the fact that the URL set in the setting information is the same before the update, and detects that only the model number is updated.

Subsequently, the updating unit 23 acquires a model number "ABC-400" of the projector "ABC-400" (S12), notifies the model number to the started service, and resets the information of the service (S13).

Then, the updating unit 23 identifies the application information corresponding to the projector "ABC-400" from the configuration information DB 14, accesses the URL identified in the application information, and acquires the template of the application so that various kinds of information are set (S14 and S15). Specifically, the application generating unit 24 sets the new model number to the template of the application.

Thereafter, the application distributing unit 25 redistributes the updated application to the mobile terminal 1 to which the application before update is already distributed (S16). As a result, even if the model number of the projector 3 is updated, the mobile terminal 1 may automatically update the target application. Therefore, the mobile terminal 1 may use a new projector 3 (S18) through the updated service (S17), by executing the installed application.

(Application Update Example)

Figure 9:
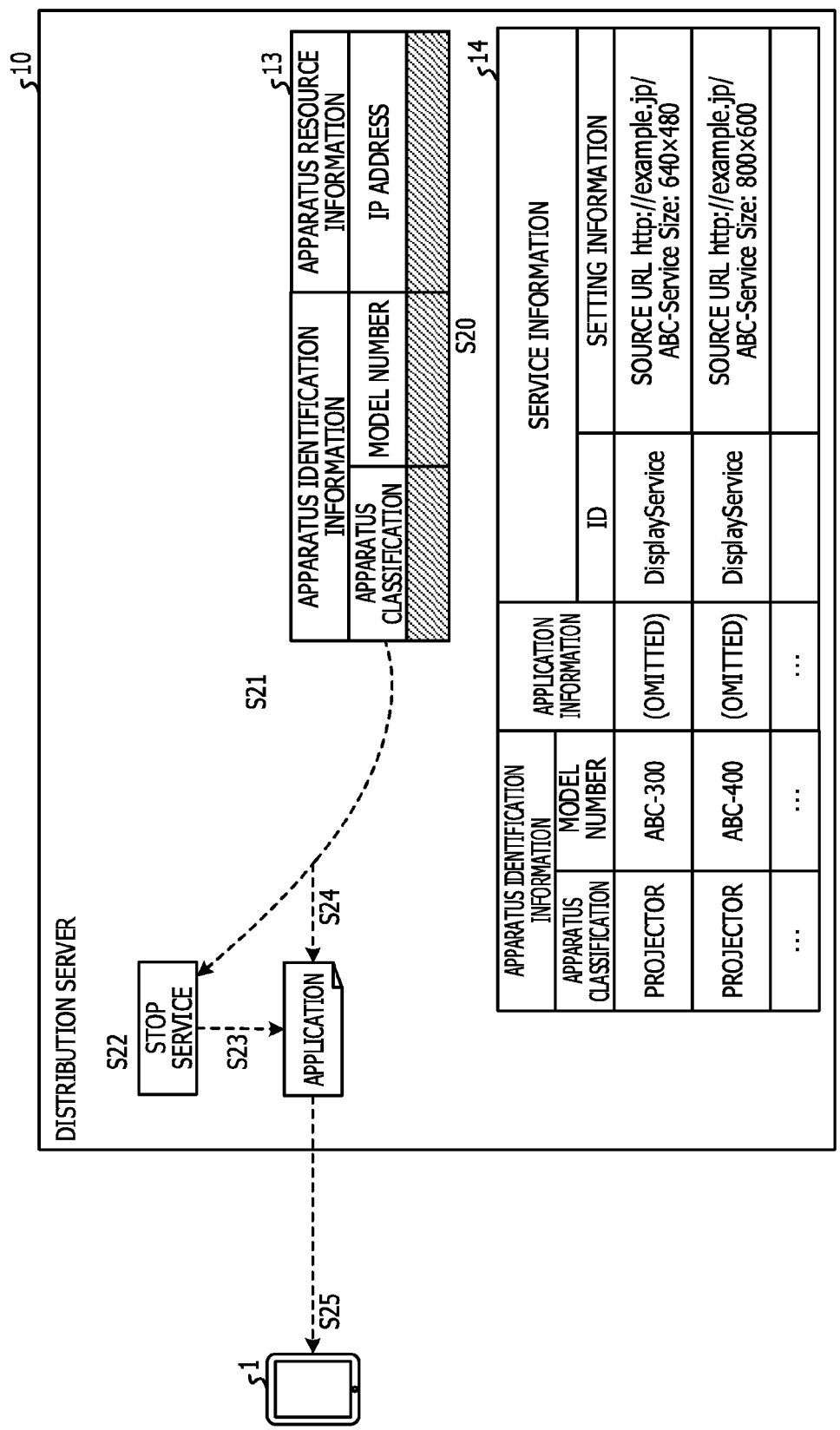
FIG. 9 is a diagram illustrating distribution of the application when the projector service according to Example 2 is deleted.

FIG. 9 is a diagram illustrating distribution of the application when the projector service according to Example 2 is deleted. Specifically, a case in which the projector is deleted from the state of FIG. 8 is described.

As illustrated in FIG. 9, the updating unit 23 of the distribution server 10 refers to the apparatus information DB 13, and confirms that the projector "ABC-400" is deleted (S20). Then, the updating unit 23 stops the service of the projector "ABC-400" (S21 and S22).

Thereafter, the application distributing unit 25 deletes the application for using the service of the projector "ABC-400" from a list of distribution target applications (S23 and S24), and redistributes the list of deleted applications to the mobile terminal 1 (S25). Specifically, the application distributing unit 25 distributes the application including a deletion command for uninstalling the applications.

(Effect)

In this manner, the distribution server 10 may update the service that operates itself based on the apparatus information, generate the application for using the service, and distribute the application to the mobile terminal 1. Accordingly, the distribution server 10 may reduce the size of the generated application, so the redistribution may be quickly performed. Therefore, when the service is updated, the application installed in the mobile terminal 1 may be quickly updated.

Example 3

Next, an example in which the distribution server 10 distributes the application for using the thermometer 4 in the range 50 to the mobile terminal 1 is described. That is, in Example 3, the mobile terminal 1 directly uses the thermometer 4 without interposing the distribution server 10.

(Application Distribution)

Figure 10:
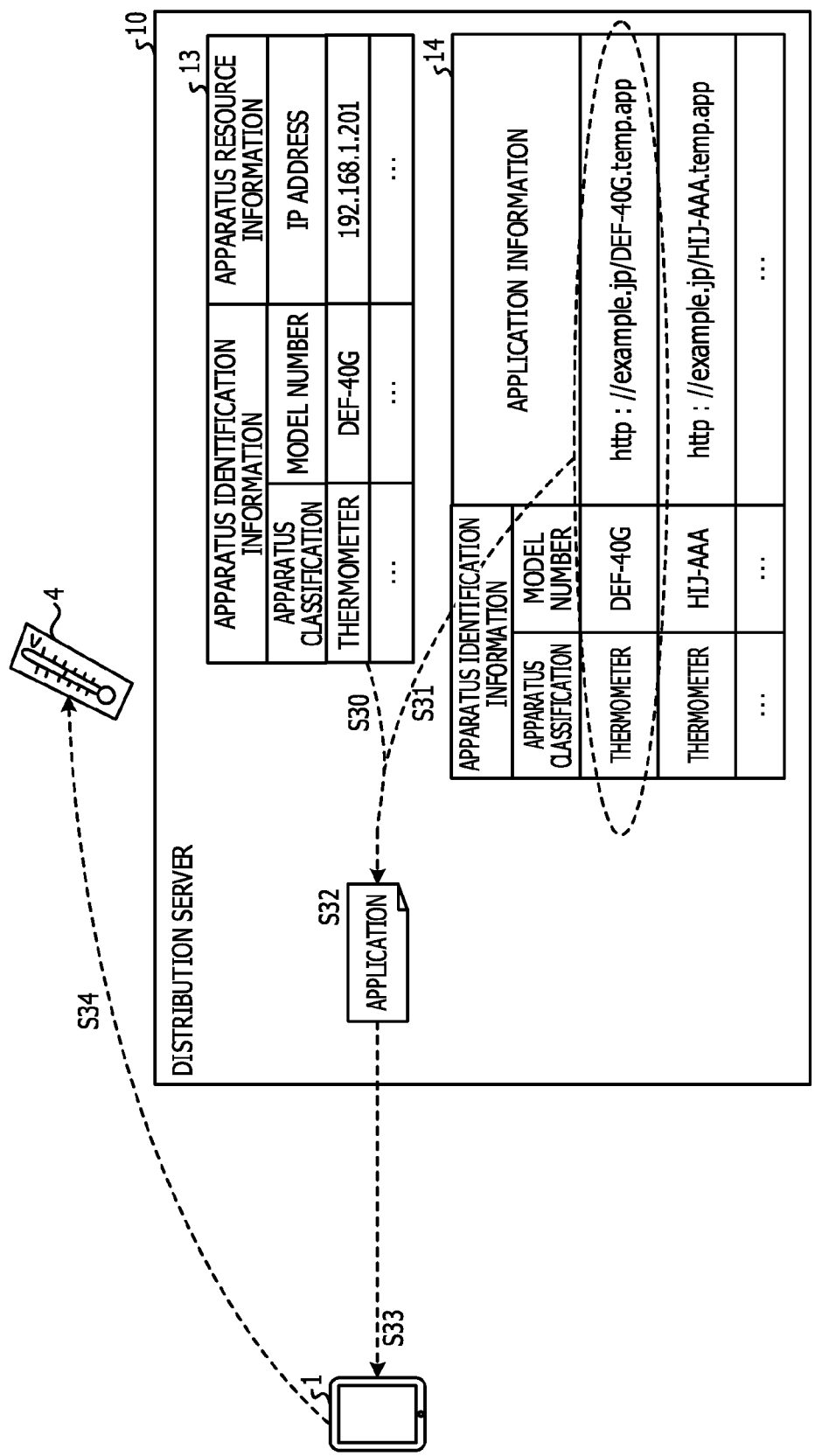
FIG. 10 is a diagram illustrating distribution of the application for using a thermometer according to Example 3.

FIG. 10 is a diagram illustrating distribution of the application for using a thermometer according to Example 3. As illustrated in FIG. 10, the service providing unit 22 of the distribution server 10 refers to the apparatus information DB 13, confirms that a thermometer "DEF-40G" is in operation, and acquires an IP address "192.168.1.201" of the thermometer "DEF-40G" (S30).

Subsequently, the service providing unit 22 identifies the configuration information corresponding to the thermometer "DEF-40G" from the configuration information DB 14, and acquires the model number or the application information (URL) (S31). Thereafter, the service providing unit 22 sets an IP address, a model number, or the like, to the template of the application acquired by accessing the URL so that the application is generated (S32).

Thereafter, the application distributing unit 25 distributes the application generated by the application generating unit 24 to the mobile terminal 1 which is detected by the detecting unit 21 to be in the range 50 (S33).

As a result, the application which acquires the measurement value by performing communication with the thermometer 4 may be automatically installed to the mobile terminal 1. The mobile terminal 1 may acquire the temperature from the thermometer 4 without interposing the distribution server 10 by executing the installed application (S34).

(Thermometer Modification Example)

Figure 11:
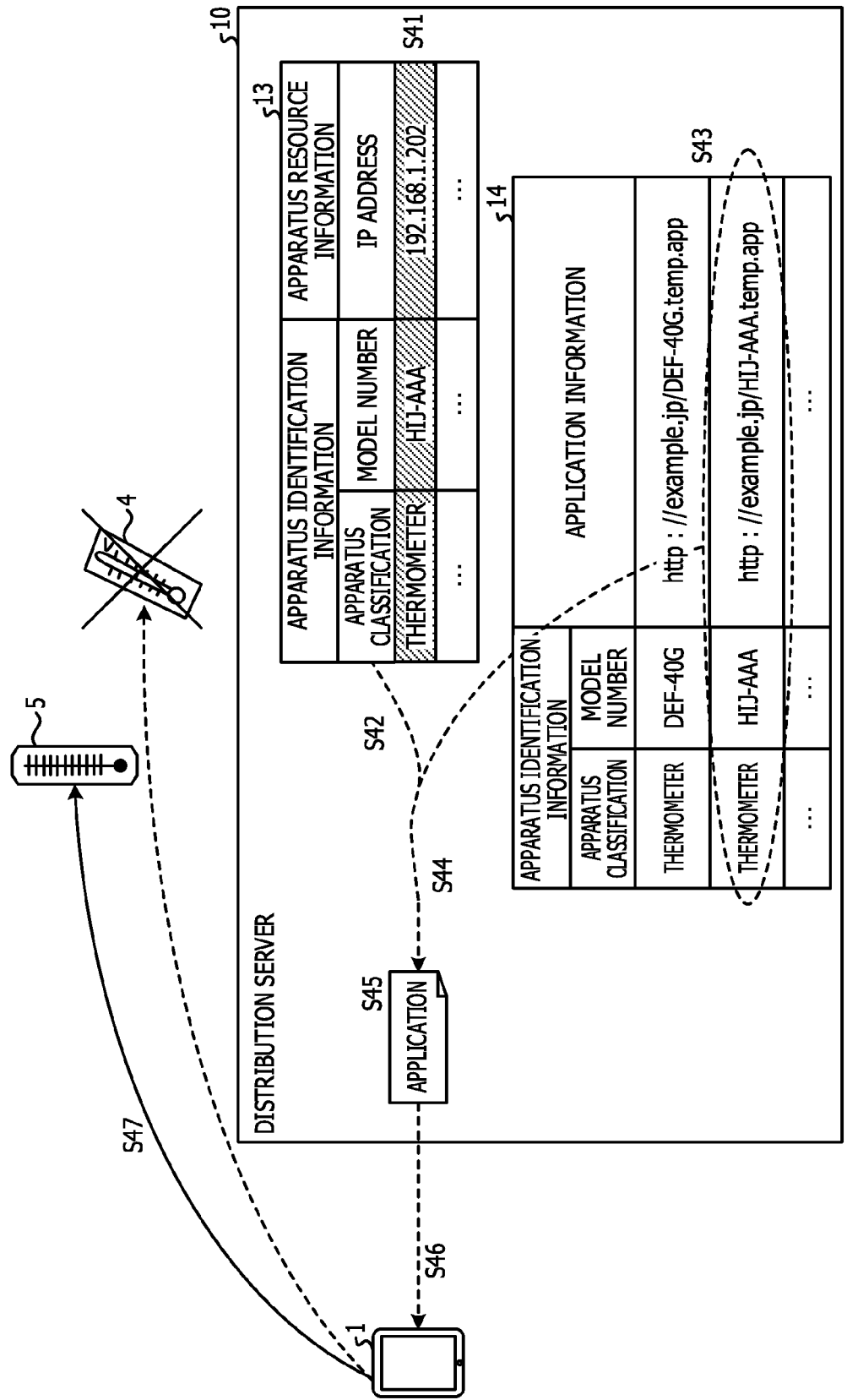
FIG. 11 is a diagram illustrating distribution of the application when the thermometer according to Example 3 is broken.

FIG. 11 is a diagram illustrating distribution of the application when the thermometer according to Example 3 is broken. Specifically, an example in which the thermometer 4 is broken and is changed to a thermometer 5 from the state of FIG. 10 is described.

As illustrated in FIG. 11, the updating unit 23 of the distribution server 10 refers to the apparatus information DB 13, and confirms that the thermometer "DEF-40G" is deleted and changed to a thermometer "HIJ-AAA" (S41). Here, the updating unit 23 confirms that the IP address is changed from "192.168.1.201" to "192.168.1.202" together with the model number of the thermometer, and acquires a new model number and a new IP address (S42).

Moreover, the updating unit 23 identifies the configuration information corresponding to the thermometer "HIJ-AAA" from the configuration information DB 14, and confirms that the application information (URL) is different from that of the previous thermometer (S43). Subsequently, the updating unit 23 identifies the configuration information corresponding to the thermometer "HIJ-AAA" from the configuration information DB 14, and acquires the model number or the application information (URL) (S44).

Thereafter, the updating unit 23 sets the IP address, the model number, or the like, to the template of the application acquired by accessing the URL, and generates the application (S45). Then, the application distributing unit 25 distributes the application updated by the updating unit 23 to the mobile terminal 1 existing in the range 50 (S46).

As a result, the application which acquires the measurement value by performing communication with the new thermometer 5 may be automatically installed to the mobile terminal 1. Therefore, the mobile terminal 1 may acquire a temperature from the thermometer 5, not from the broken thermometer 4, by executing the installed application (S47).

(Effect)

In this manner, the distribution server 10 may distribute the application to the respective mobile terminals 1, and execute the services on the mobile terminals 1 side. Accordingly, when the plurality of mobile terminals 1 exist, the distribution server 10 may reduce the process load of the distribution server 10 compared with the case where the service in the distribution server 10 is used.

Example 4

Next, an example in which the distribution server 10 distributes the application for linking mobile terminals existing in the range 50 to the mobile terminal 1 is described.

(Screen Linkage)

Figure 12:
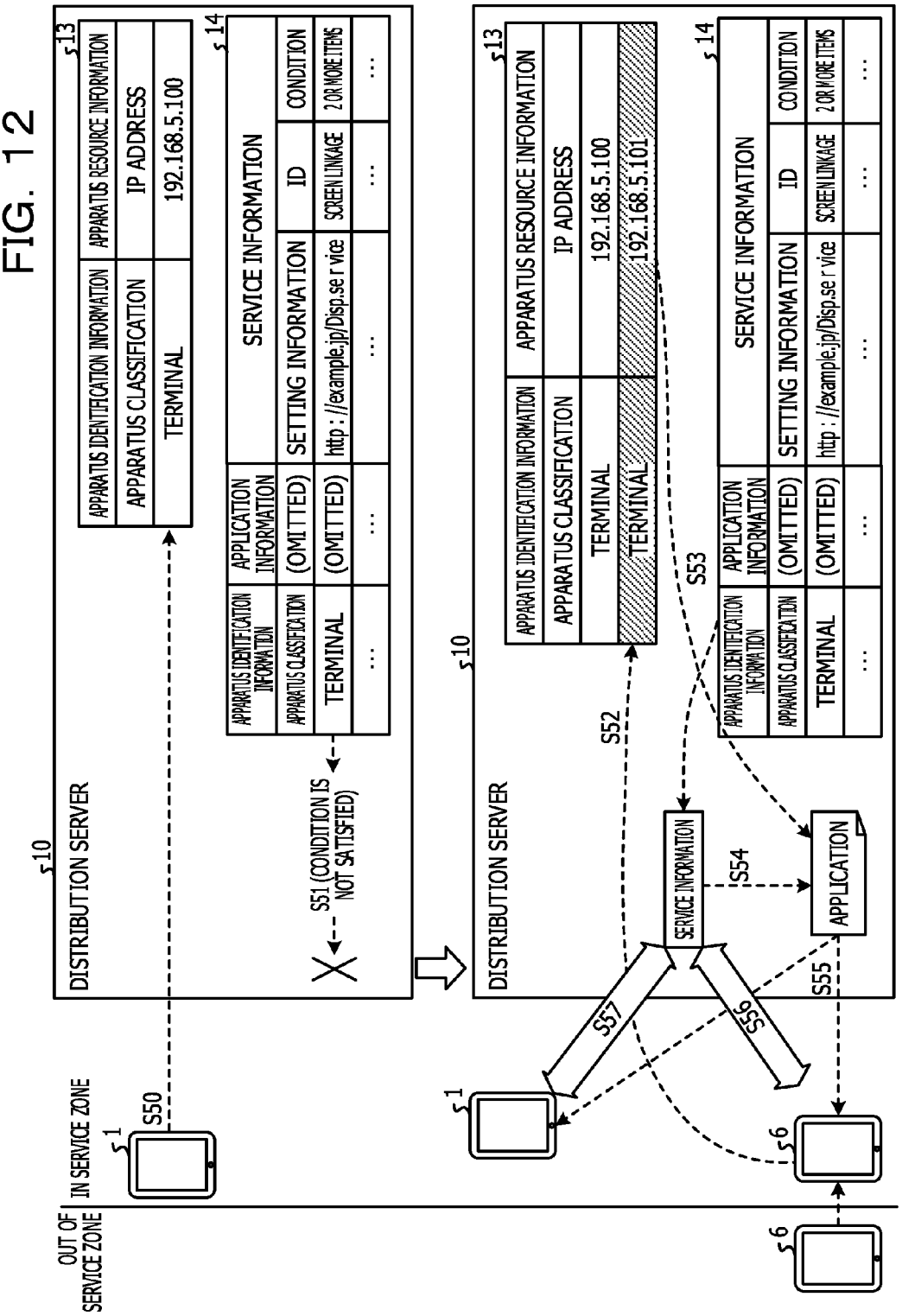
FIG. 12 is a diagram illustrating distribution of a screen linkage application according to Example 4.

FIG. 12 is a diagram illustrating distribution of a linkage application according to Example 4. As illustrated in the upper portion of FIG. 12, the detecting unit 21 of the distribution server 10 detects the mobile terminal 1 in the range 50 which is a service zone, acquires an IP address "192.168.5.100" from the mobile terminal 1, and stores the IP address "192.168.5.100" to the apparatus information DB 13 in association with an apparatus classification "terminal" (S50).

Then, the service providing unit 22 identifies the application information corresponding to the apparatus classification "terminal" registered in the apparatus information DB 13, the setting information "URL (http://example.jp/Disp.service)", a service ID "screen linkage", and a condition "2 or more items". Here, since the identified service condition is "2 or more items" and the start condition is not satisfied, the service providing unit 22 controls the start of the service (S51).

Thereafter, as illustrated in the lower portion of FIG. 12, the detecting unit 21 detects a mobile terminal 6 in the range 50 which is the service zone, and acquires an IP address "192.168.5.101" from the mobile terminal 6, and registers the IP address "192.168.5.101" in the apparatus information DB 13 in association with the apparatus classification "terminal" (S52).

Then, since the condition "2 or more items" corresponding to the apparatus classification "terminal" is satisfied, the service providing unit 22 acquires the process by accessing the setting information "URL (http://example.jp/Disp.service)", and starts the service (S53).

Subsequently, the application generating unit 24 acquires the template of the application by accessing the URL indicated in the application information corresponding to the apparatus classification "terminal", sets the IP addresses of the respective terminals and the ID "screen linkage" to the template, and generates the application (S54). Then, the application distributing unit 25 distributes the generated application respectively to the mobile terminal 1 and the mobile terminal 6 (S55).

As a result, the mobile terminal 6 and the mobile terminal 1 may execute the screen linkage through the service of the distribution server 10 (S56 and S57). For example, the screen displayed on the mobile terminal 6 may be displayed on the mobile terminal 1, and thus the screen linkage may be applied to a teleconference.

(E-Mail Address Exchange Application)

Figure 13:
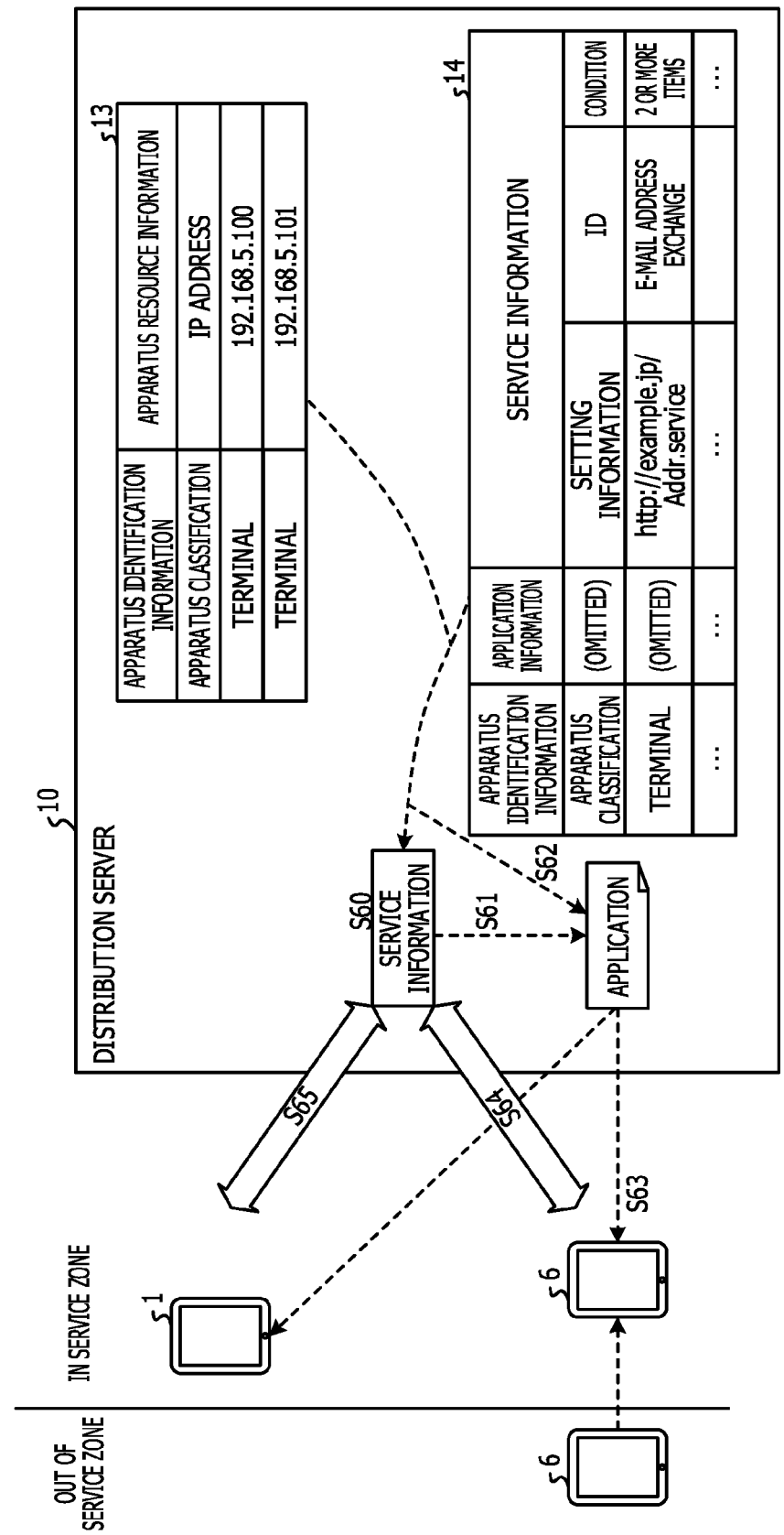
FIG. 13 is a diagram illustrating distribution of an e-mail address exchange application according to Example 4.

FIG. 13 is a diagram illustrating distribution of an e-mail address exchange application according to Example 4. In the example of FIG. 13, the distribution server 10 detects the mobile terminal 1 and the mobile terminal 6 in the range 50 which is the service zone, and the IP address "192.168.5.100" of the mobile terminal 1 and the IP address "192.168.5.101" of the mobile terminal 6 are registered in the apparatus information DB 13 in advance.

In such a state, since a condition "two or more items" corresponding to the apparatus classification "terminal" is satisfied, the service providing unit 22 acquires a process by accessing the setting information "URL (http://example.jp/Addr.service)", and starts the service "e-mail address exchange" (S60).

Subsequently, the application generating unit 24 acquires the template of the application by accessing the URL indicated in the application information corresponding to the apparatus classification "terminal", and sets the IP addresses of the respective terminals and an ID "e-mail address exchange" to the template, and generates the application (S61 and S62). Then, the application distributing unit 25 distributes the generated application respectively to the mobile terminal 1 and the mobile terminal 6 (S63).

As a result, the mobile terminal 6 and the mobile terminal 1 may exchange e-mail addresses with each other through the service of the distribution server 10 (S64 and S65).

(Effect)

In this manner, the respective mobile terminals may use the service while existing in the service zone, and may also use the information obtained by the used service when the mobile terminals are out of the service zone. Accordingly, since the relationship of the mobile terminals may be strengthened regardless of the service zone, the enhancement or aggregation of the convenience of the user may be expected.

Example 5

Next, an example in which the distribution server 10 dynamically changes the application to be distributed according to a circuit used by the mobile terminal is described.

Figure 14:
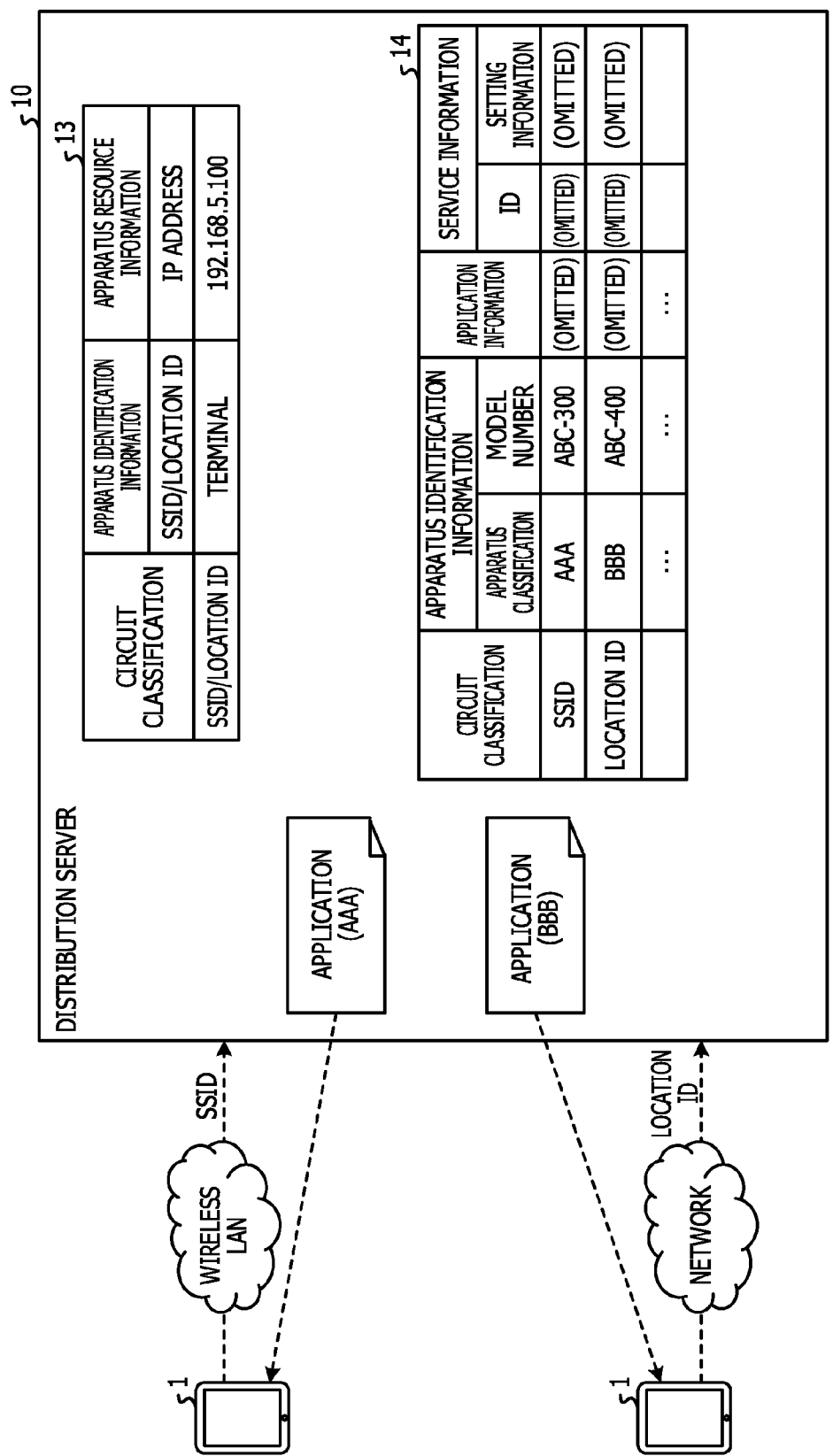
FIG. 14 is a diagram illustrating distribution of an application based on a used circuit of a mobile terminal according to Example 5.

FIG. 14 is a diagram illustrating distribution of the application based on the used circuit of the mobile terminal according to Example 5. As illustrated in FIG. 14, the distribution server 10 stores the configuration information DB 14 in association with the circuit classification, the apparatus identification information, the application information, and the service information.

Then, when the distribution server 10 receives a control signal, a distribution request of the application, or the like through an access point of the wireless LAN from the mobile terminal 1, the distribution server 10 derives an SSID of the access point of the wireless LAN from the received information. Then, the distribution server 10 generates the application by accessing the URL of the application information in association with the acquired SSID, and distributes the application to the mobile terminal 1. As a result, the distribution server 10 may generate an application corresponding to an apparatus classification "AAA" that is available when being connected to the access point of the wireless LAN, and may distribute the application to the mobile terminal 1.

Meanwhile, when the distribution server 10 receives the control signal, the distribution request of the application, or the like, through a network from the mobile terminal 1, the distribution server 10 acquires a location ID from the received information. Then, the distribution server 10 accesses the URL of the application information in association with the acquired location ID, generates the application, and distributes the application to the mobile terminal 1. As a result, the distribution server 10 generates the application in association with an apparatus classification "BBB" that may use the network, and distributes the application to the mobile terminal 1.

Further, a case where the access point of the wireless LAN and the network are used together is described herein, but only one of them may be used. When only the access point of the wireless LAN is used, the number of the access points of the wireless LAN that are used when the distribution server 10 receives the control signal, the distribution request of the application, or the like may be limited to be one so that the circuit classifications of the apparatus information DB 13 or the configuration information DB 14 may be omitted.

Figure 15:
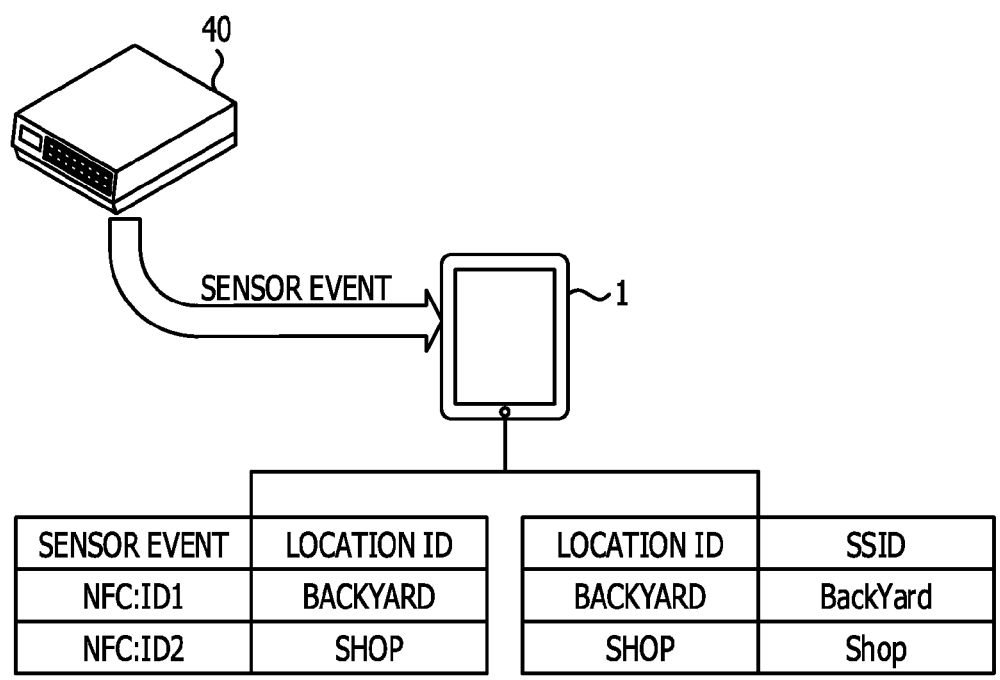
FIG. 15 is a diagram illustrating a process in which the mobile terminal according to Example 5 identifies a location ID.

Here, an example of a method in which the mobile terminal 1 transmits the location ID is described. FIG. 15 is a diagram illustrating a process in which the mobile terminal according to Example 5 identifies the location ID. As illustrated in FIG. 15, the mobile terminal 1 maintains a table in which sensor events and location IDs are associated with each other and a table in which location IDs and SSIDs are associated with each other.

Then, when the mobile terminal 1 enters the range 50 which is the service zone, the signal sent from an anchor 40 installed in the range 50 is received by a sensor embedded in the mobile terminal 1 as a sensor event. Further, an example of the anchor 40 is a sensor that may perform noncontact-type communication, and various kinds of sensors that may perform short range communication may be applied.

Here, when the mobile terminal 1 receives a sensor event "NFC:ID1" from the anchor 40, the mobile terminal 1 identifies a location ID "backyard" corresponding to the sensor event "NFC:ID1", and transmits the identified location ID "backyard" to the distribution server 10. In addition, the mobile terminal 1 may identify an SSID "BackYard" corresponding to the identified location ID "backyard", and transmit the SSID "BackYard" to the distribution server 10.

Meanwhile, the mobile terminal 1 receives a sensor event "NFC:ID2" from the anchor 40, identifies a location ID "shop" corresponding to the sensor event "NFC:ID2", and transmits the identified location ID "shop" to the distribution server 10. In addition, the mobile terminal 1 may identify an SSID "Shop" corresponding to the identified location ID "shop", and transmit the SSID "Shop" to the distribution server 10.

In this manner, the mobile terminal 1 performs determination for identifying its own position by the information from a sensor in a location in which the device is positioned, and distributes the information to the distribution server 10. As a result, the mobile terminal 1 may automatically acquire an appropriate application corresponding to the peripheral apparatus that is available in its own position.

Example 6

In the above, the examples of the present disclosure are described, but the disclosure may be practiced in various kinds of embodiments in addition to the examples described above.

(Service Provision Source)

In the examples above, examples in which the distribution server 10 executes the service are described, but the examples are limited thereto, and the service may be performed by other servers. In this case, the distribution server 10 sets various kinds of information such as the service ID to the service performed by the other servers.

(Application to Cloud System)

In addition, the place managed by the distribution server 10 is not limited to a physical location, but the disclosure may be applied to a logical location. For example, the distribution server 10 is disposed on the cloud system, and logically partitions the cloud system. Then, the distribution server 10 generates the application by using the information of the apparatus that is available in the logical space that is managed by itself, and distributes the application to the mobile terminal 1 that enters the logical space.

(Load Sharing)

The distribution server 10 may select and distribute an application that uses the service of itself or an application that directly uses the peripheral apparatus according to the load condition of itself. For example, the distribution server 10 monitors the load condition of itself. When the load is high, the distribution server 10 generates and distributes the application that directly uses the peripheral apparatus and when the load is low, the distribution server 10 starts the service by itself, and generates and distributes the application that uses the peripheral apparatus through the service of itself.

(System)

In addition, respective configurations of the illustrated device do not have to be physically configured as described above. That is, the configuration may be distributed or combined into certain units. Moreover, the entirety or an arbitrary portion of respective process functions performed by the respective devices may be realized in a CPU or a program interpreted and performed by the CPU, or may be realized as hardware by a wired logic.

In addition, among the respective processes described in this example, the entirety or a portion of a process described to be automatically performed may be manually performed, or the entirety or a portion of a process described to be manually performed may be automatically performed by a well-known method. In addition, processing methods, controlling methods, specific names, and information including various kinds of data or parameters which are described in the specification or the drawings may be arbitrarily changed unless otherwise indicated.

(Hardware)

Figure 16:
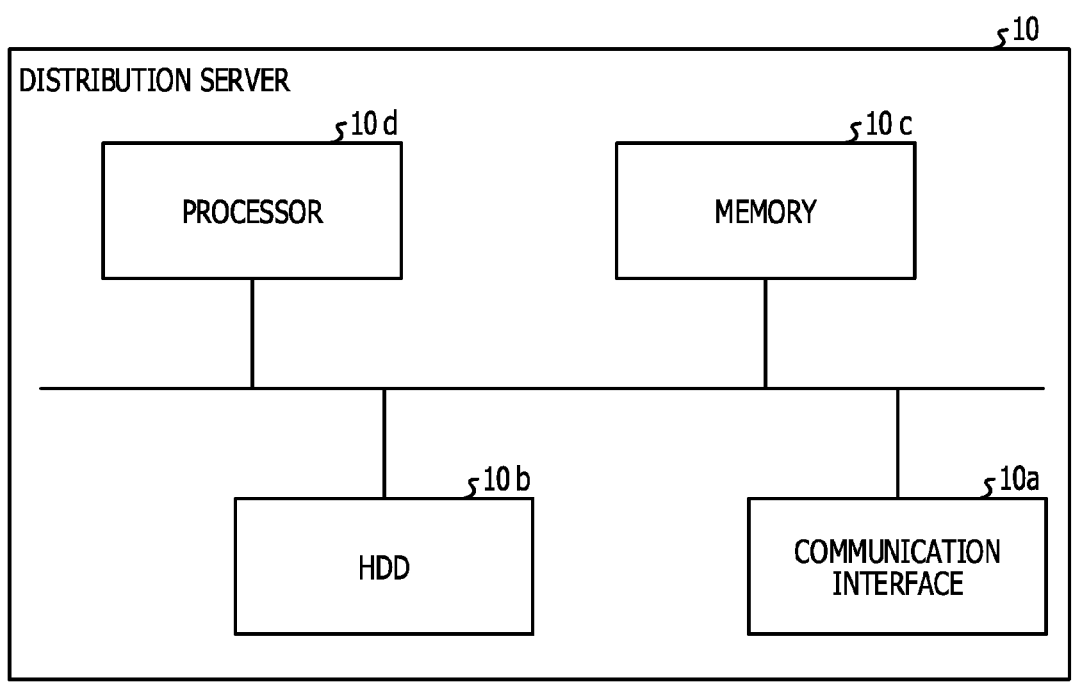
FIG. 16 is a diagram illustrating an example of a configuration of hardware.

FIG. 16 is a diagram illustrating an example of the configuration of hardware. As illustrated in FIG. 16, the distribution server 10 includes a communication interface 10a, a hard disk drive (HDD) 10b, a memory 10c, and a processor 10d. In addition, the respective units illustrated in FIG. 16 are connected to each other through a bus or the like.

The communication interface 10a is an interface for controlling the communication with other devices, and is, for example, a network interface card. The HDD 10b stores the program or the DB that operates functions indicated by FIG. 2 or the like.

The processor 10d operates the process for performing respective functions described in FIG. 2 or the like by reading programs for executing processes in the same manner as in the respective processing units illustrated in FIG. 2 or the like from the HDD 10b or the like, and developing the programs on the memory 10c.

That is, the process performs the same function as in the respective processing units included in the distribution server 10. Specifically, the processor 10d reads programs having the same functions as the detecting unit 21, the service providing unit 22, the updating unit 23, the application generating unit 24, the application distributing unit 25, and the like, to the HDD 10b or the like. Then, the processor 10d performs processes that performs the same processes as the detecting unit 21, the service providing unit 22, the updating unit 23, the application generating unit 24, and the application distributing unit 25.

In this manner, the distribution server 10 operates as an information process device that performs the application distribution method by reading and performing the program. In addition, the distribution server 10 reads the program from a recording medium by the medium reading device, and performs the read program so that the distribution server 10 may realize the functions in the same manner as in the examples described above. Further, a program according to the other example is not limited to be performed by the distribution server 10. For example, even when the other computer or the other server executes the program, or the other computer and the other server executes the program in cooperation, the disclosure may be applied in the same manner.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A distribution apparatus comprising:
at least one processor; and
a memory which stores a plurality of instructions, which when executed by the at least one processor, cause the processor to execute:
storing information of a located device that is available in a predetermined location and a template to generate an application to be used when the located device is used in a storage unit;
generating the application by using the stored information of the located device and the stored template; and
distributing the application to a mobile terminal when the mobile terminal is detected in the predetermined location.

2. The apparatus according to claim 1,
wherein in the storing, device information for identifying the located device is further stored in the storage unit, and
wherein in the generating, the device information and service information relating to a service using the located device which are stored in the storage unit are set to a template of an application that uses the located device, and the application is generated.

3. The apparatus according to claim 1,
wherein in the storing, device information for identifying the located device is further stored in the storage unit, and
wherein in the generating, the device information and service information relating to a service using the located device which are stored in the storage unit are set to the service and also to a template of an application that uses the service, and the application is generated.

4. The apparatus according to claim 2,
wherein in the storing, the service information relating to the service using the located device is further stored in the storage unit.

5. The apparatus according to claim 1,
wherein in the generating, when an update of the information of the located device stored in the storage unit is detected, the application is generated by using the information of the located device after the update, and
wherein in the distributing, an application after the update is redistributed to the mobile terminal to which an application before the update is already distributed.

6. The apparatus according to claim 1, further comprising:
acquiring, from a mobile terminal existing in a position capable of using the located device, information relating to the mobile terminal,
wherein in the generating, an application to be used to perform a terminal linkage service that uses the mobile terminal is generated by using the acquired information relating to the mobile terminal, and
wherein in the distributing, when a new mobile terminal is detected in the predetermined location capable of using the located device, the application to be used to perform the terminal linkage service generated in the generating is distributed to the detected new mobile terminal.

7. The apparatus according to claim 1,
wherein in the storing, an identifier that identifies a location capable of using the located device is stored in the storage unit in association with the information of the located device, and
wherein in the generating, when the identifier identified according to event information that the mobile terminal acquires from a sensor is received from the mobile terminal, the information of the located device that being associated with the received identifier is identified from the storage unit, and the application is generated by using the identified information of the located device.

8. The apparatus according to claim 1,
wherein in the storing, circuit information that is used when using the located device in association with the information of the located device, and identifies a wireless communication circuit is stored in the storage unit, and
wherein in the generating, the information of the located device that being associated with the circuit information included in data received from the mobile terminal is identified from the storage unit, and the application is generated by using the identified information of the located device.

9. A distribution method comprising:
storing information of a located device that is available in a predetermined location and a template to generate an application to be used when the located device is used in a storage unit;
generating the application by using the stored information of the located device and the stored template; and
distributing, by a computer processor, the application to a mobile terminal when the mobile terminal is detected in the predetermined location.

10. The method according to claim 9,
wherein in the storing, device information for identifying the located device is further stored in the storage unit, and
wherein in the generating, the device information and service information relating to a service using the located device which are stored in the storage unit are set to a template of an application that uses the located device, and the application is generated.

11. The method according to claim 9,
wherein in the storing, device information for identifying the located device is further stored in the storage unit, and
wherein in the generating, the device information and service information relating to a service using the located device which are stored in the storage unit are set to the service and also to a template of an application that uses the service, and the application is generated.

12. The method according to claim 10,
wherein in the storing, the service information relating to the service using the located device is further stored in the storage unit.

13. The method according to claim 9,
wherein in the generating, when an update of the information of the located device stored in the storage unit is detected, the application is generated by using the information of the located device after the update, and
wherein in the distributing, an application after the update is redistributed to the mobile terminal to which an application before the update is already distributed.

14. The method according to claim 9, further comprising:
acquiring, from a mobile terminal existing in a position capable of using the located device, information relating to the mobile terminal,
wherein in the generating, an application to be used to perform a terminal linkage service that uses the mobile terminal is generated by using the acquired information relating to the mobile terminal, and
wherein in the distributing, when a new mobile terminal is detected in the predetermined location capable of using the located device, the application to be used to perform the terminal linkage service generated in the generating is distributed to the detected new mobile terminal.

15. The method according to claim 9,
wherein in the storing, an identifier that identifies a location capable of using the located device is stored in the storage unit in association with the information of the located device, and
wherein in the generating, when the identifier identified according to event information that the mobile terminal acquires from a sensor is received from the mobile terminal, the information of the located device that being associated with the received identifier is identified from the storage unit, and the application is generated by using the identified information of the located device.

16. The method according to claim 9,
wherein in the storing, circuit information that is used when using the located device in association with the information of the located device, and identifies a wireless communication circuit is stored in the storage unit, and
wherein in the generating, the information of the located device that being associated with the circuit information included in data received from the mobile terminal is identified from the storage unit, and the application is generated by using the identified information of the located device.

17. A computer-readable non-transitory storage medium storing a distribution program that causing a computer to execute a process comprising:
storing information of a located device that is available in a predetermined location and a template to generate an application to be used when the located device is used in a storage unit;
generating the application by using the stored information of the located device and the stored template; and
distributing the application to a mobile terminal when the mobile terminal is detected in the predetermined location.

18. The apparatus according to claim 1, wherein
the predetermined location is determined based on a located position of the located device.

19. The apparatus according to claim 1, wherein
the template includes access logic for access to the located device and does not include at least one configuration value;
the information of the located device includes device information and service information, the device information identifying the located device, the service information indicating a service that uses the located device; and
the processor is configured to embed, in the generating, the device information and the service information in the template as the at least one configuration value.

* * * * *